US011733860B2

(12) United States Patent
Vouillamoz et al.

(10) Patent No.: US 11,733,860 B2
(45) Date of Patent: Aug. 22, 2023

(54) FINGER-FLUID INTERFACING METHOD AND DEVICE

(71) Applicant: Preciflex SA, Neuchâtel (CH)

(72) Inventors: Lucien Vouillamoz, Feusisberg (CH);
Federica Carpano, Neuchâtel (CH);
Jean Gubelmann, Auvernier (CH);
Alain Jaccard, Ste-Croix (CH)

( * ) Notice: Subject to any disclaimer, the term of this patent is extended or adjusted under 35 U.S.C. 154(b) by 0 days.

(21) Appl. No.: 16/981,370

(22) PCT Filed: Mar. 20, 2019

(86) PCT No.: PCT/IB2019/052259
§ 371 (c)(1),
(2) Date: Sep. 16, 2020

(87) PCT Pub. No.: WO2019/180637
PCT Pub. Date: Sep. 26, 2019

(65) Prior Publication Data
US 2021/0004153 A1     Jan. 7, 2021

Related U.S. Application Data

(60) Provisional application No. 62/645,202, filed on Mar. 20, 2018.

(51) Int. Cl.
*G06F 3/04883* (2022.01)
*G06F 3/044* (2006.01)
(52) U.S. Cl.
CPC ........ *G06F 3/04883* (2013.01); *G06F 3/0443* (2019.05); *G06F 3/0447* (2019.05)

(58) Field of Classification Search
CPC .................. G02B 26/005; G06F 3/04883
See application file for complete search history.

(56) References Cited

U.S. PATENT DOCUMENTS

2011/0248941 A1\* 10/2011 Abdo .................... G06F 3/0488
345/173
2013/0044100 A1    2/2013 King
(Continued)

FOREIGN PATENT DOCUMENTS

| CN | 102364413 A | 2/2012 |
| CN | 103592759 A | 2/2014 |

(Continued)

OTHER PUBLICATIONS

International Search Report, International patent application No. PCT/IB2019/052259, dated Jul. 11, 2019.

*Primary Examiner* — Matthew A Eason
*Assistant Examiner* — Chayce R Bibbee
(74) *Attorney, Agent, or Firm* — John Moetteli; Da Vinci Partners LLC

(57) ABSTRACT

A system and method/apparatus is provided which enables the intuitive manipulation of small amounts of fluids in a closed environment such as a display, an analysis system, a chemical reactor, with complete user safety ensured. With this invention, the user can move a droplet of fluid seemingly using the tip of his finger, while not really touching the fluid. Usage for this invention may be found in fluidic displays, medical analysis equipment, chemical analysis equipment, educational material, and similar applications.

17 Claims, 3 Drawing Sheets

(56) References Cited

U.S. PATENT DOCUMENTS

| | | | |
|---|---|---|---|
| 2015/0262521 A1* | 9/2015 | Yeh | G06F 3/0412 |
| | | | 345/173 |
| 2016/0139751 A1* | 5/2016 | Flawn | G06F 3/0483 |
| | | | 715/230 |
| 2016/0178889 A1* | 6/2016 | Massard | H01J 9/205 |
| | | | 359/290 |
| 2016/0188137 A1 | 6/2016 | Parker | |
| 2018/0133395 A1 | 5/2018 | Margairaz et al. | |

FOREIGN PATENT DOCUMENTS

| | | |
|---|---|---|
| EP | 0180628 A1 | 5/1986 |
| WO | 2008/064092 A2 | 5/2008 |

* cited by examiner

FINGER-FLUID INTERFACING METHOD AND DEVICE

CROSS REFERENCE TO RELATED APPLICATIONS

This application is the National Stage of International Application No. PCT/IB2019/052259, filed Mar. 20, 2019, which claims benefit under 35 USC § 119(a), to U.S. provisional patent application Ser. No. 62/645,202, filed Mar. 20, 2018.

CROSS REFERENCE TO RELATED APPLICATIONS

This application claims the benefit of U.S. Provisional Application 62/645,202, filed Mar. 20, 2018, entitled: FINGER-FLUID INTERFACING METHOD AND DEVICE, the content of the entirety of which are explicitly incorporated herein by reference and relied upon to define features for which protection may be sought hereby as it is believed that the entirety thereof contributes to solving the technical problem underlying the invention, some features that may be mentioned hereunder being of particular importance.

COPYRIGHT & LEGAL NOTICE

A portion of the disclosure of this patent document contains material which is subject to copyright protection. The Applicant has no objection to the facsimile reproduction by anyone of the patent document or the patent disclosure as it appears in the Patent and Trademark Office patent file or records, but otherwise reserves all copyright rights whatsoever. Further, no references to third party patents or articles made herein is to be construed as an admission that the present invention is not entitled to antedate such material by virtue of prior invention.

BACKGROUND OF THE INVENTION

Several methods and devices to manipulate small amounts of fluids are well known, the oldest being the use of a syringe and needle, more modern techniques include micro-pumps of different types such as piezo pumps, gear pumps, electromagnetic pumps, etc.

Such systems have the ability for precise handling of fluids, however the interface with the user in order to command the fluid(s) movements is usually through programs, screens, buttons, etc., which limits their usage to technically-educated personnel.

What is needed therefore is a human interface for manipulating a small amount of fluid which is intuitive and easy to operate.

SUMMARY OF THE INVENTION

A system and method/apparatus is provided which enables the intuitive manipulation of small amounts of fluids in a closed environment such as a display, an analysis system, a chemical reactor, with which complete user safety is ensured. With this invention, the user is enabled to move a droplet of fluid seemingly at the tip of his finger, while not directly touching the fluid.

The invention is useful in fluidic displays, medical analysis equipment, chemical analysis equipment, educational material, and similar applications.

An object of the invention is a method to detect the user's finger, and to control the movement of the selected fluid(s) as a consequence of such detection.

Another object of the invention is to provide a device in which the movement of one or more fluids can be controlled securely to follow the movement of the user's finger(s).

Another object of the invention is to provide a reliable and intellectually attractive educational experimentation setup.

Another object of the invention is to provide an aesthetic, reliable and intellectually attractive fluidic display.

Another object of the invention is to provide a jewelry item with fluidic display, in which the display can be modified following the touch of the user's finger.

Another object of the invention is to provide a timepiece with fluidic display, in which the setting can be made following the touch of the user's finger.

Another object of the invention is to provide a showcase with fluidic display, in which an animation can be activated and controlled by the touch of the user's finger on a touch panel.

BRIEF DESCRIPTION OF THE DRAWINGS

The attached drawings represent, by way of example, different embodiments of the subject of the invention.

Those skilled in the art will appreciate that elements in the Figures are illustrated for simplicity and clarity and have not necessarily been drawn to scale. For example, dimensions may be exaggerated relative to other elements to help improve understanding of the invention and its embodiments. Furthermore, when the terms 'first', ' second', and the like are used herein, their use is intended for distinguishing between similar elements and not necessarily for describing a sequential or chronological order. Moreover, relative terms like 'front', 'back', 'top' and 'bottom', and the like in the Description and/or in the claims are not necessarily used for describing exclusive relative position. Those skilled in the art will therefore understand that such terms may be interchangeable with other terms, and that the embodiments described herein are capable of operating in other orientations than those explicitly illustrated or otherwise described.

DETAILED DESCRIPTION OF THE PREFERRED EMBODIMENT

The following description is not intended to limit the scope of the invention in any way as it is exemplary in nature, serving to describe the best mode of the invention known to the inventors as of the filing date hereof. Consequently, changes may be made in the arrangement and/or function of any of the elements described in the exemplary embodiments disclosed herein without departing from the spirit and scope of the invention.

Figure 1:
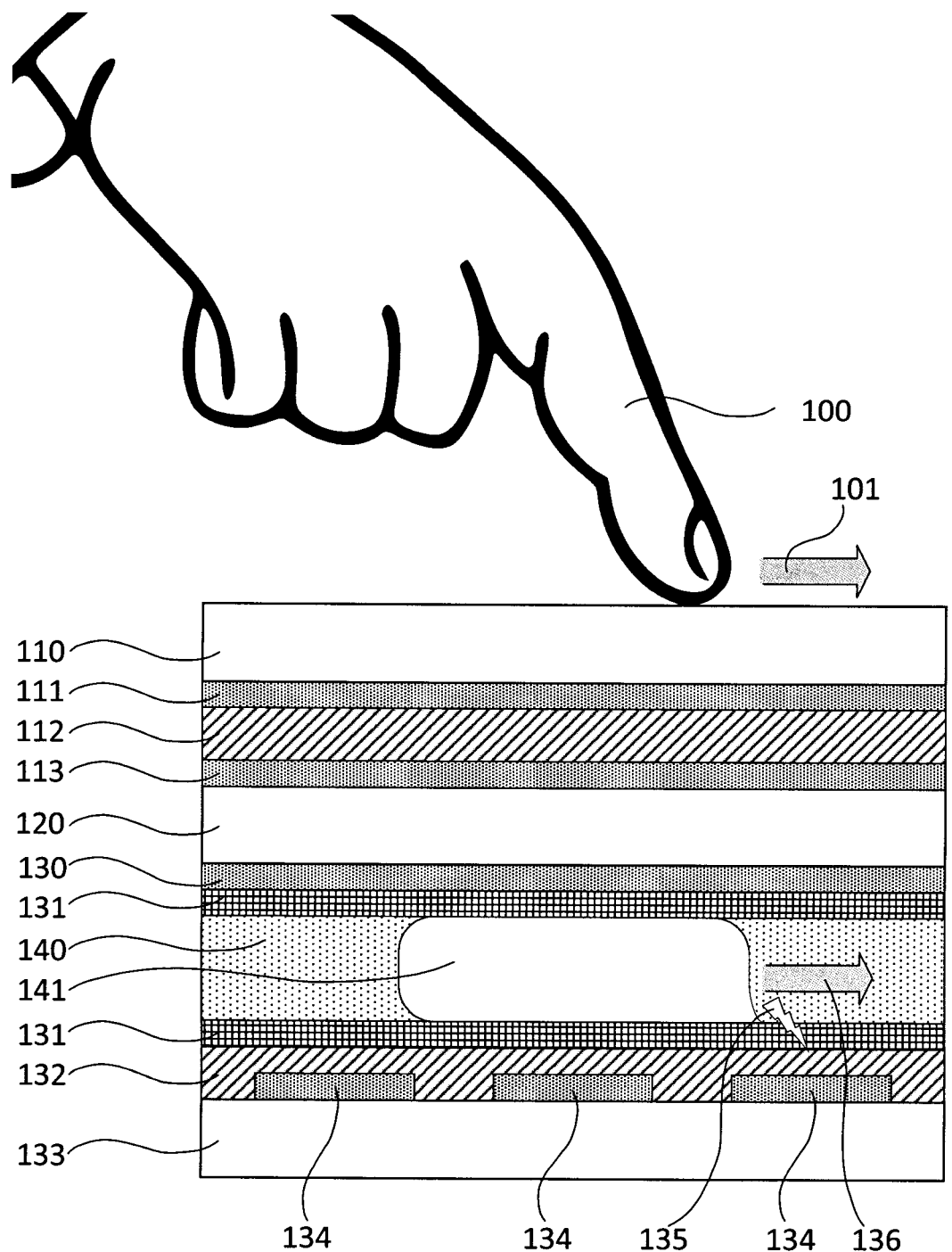
FIG. 1 is a cross sectional view of a section of the system of the invention.

Referring now to FIG. 1, representing the system according to the invention, where the user moves his finger 100 in a direction 101 on the system's top cover 110, and the fluid droplet 141 follows the same moves in the same direction 136, but with controlled acceleration and speed as supervised by the system's control electronics and software. The position and movement 101 of the user's finger 100 are measured by a touch-screens' measurement or detection system, represented by way of example here as a capacitive system made up of 2 electrode layers 111 and 113 separated by insulator 112 and driven by the system's control electronics and software. The measurement or detection system 111, 112, 113 is separated from the fluid display 130, 131, 132, 133, 134, 140, 141 by a transparent and/or colored layer 120. The fluidic display is represented here as an electrowetting-enabling chamber, with the fluid droplet 141, which is non-miscible with the passive fluid 140, gliding on a repulsive layer 131, the repulsive character of which is obtained by a combination of coating and/or microstructurization of the surface. On one side, behind the repulsive layer 131, the common electrode 130 is located, and on the other side an electrical insulation 132 and more than one control electrode 134 are located. The electrical activation of the control electrode 134, represented by a thunderbolt sign 135 turns a localized area of the generally repulsive layer 131 into an attractive layer, and as a consequence, the droplet moves in direction 136 with respect to the activated electrode.

The whole system may be built as a stack where the finger measurement or detection system is above the fluidic display. In such case, the whole finger measurement or detection system is made of transparent or translucent and/or colored materials in such a way that the fluid droplet 141 is visible to the user.

The entire system including the display may be made transparent so as to allow observation under a microscope, or observation by a camera from below, or to allow the installation of a dial under the system so that the system may be used as an indication device.

The display may also be used as a decorative element that takes the place of a window. In this case, it may be built from generally transparent materials.

The dimensions of the system may be chosen so that the behavior of the fluids 140, 141 remains capillary, which allows the creation of vertical displays, easily transportable systems or even wearable systems (such as watches, jewelry, etc). However, this method may also be used for larger systems, such as a wall display, where the movement of the fluid droplet 141 is obtained by other transportation means (ultrasonic, magnetic, etc). A combination of remote finger detection (on a smartphone or tablet for example) may be used to animate the fluid droplet 141.

Figure 2:
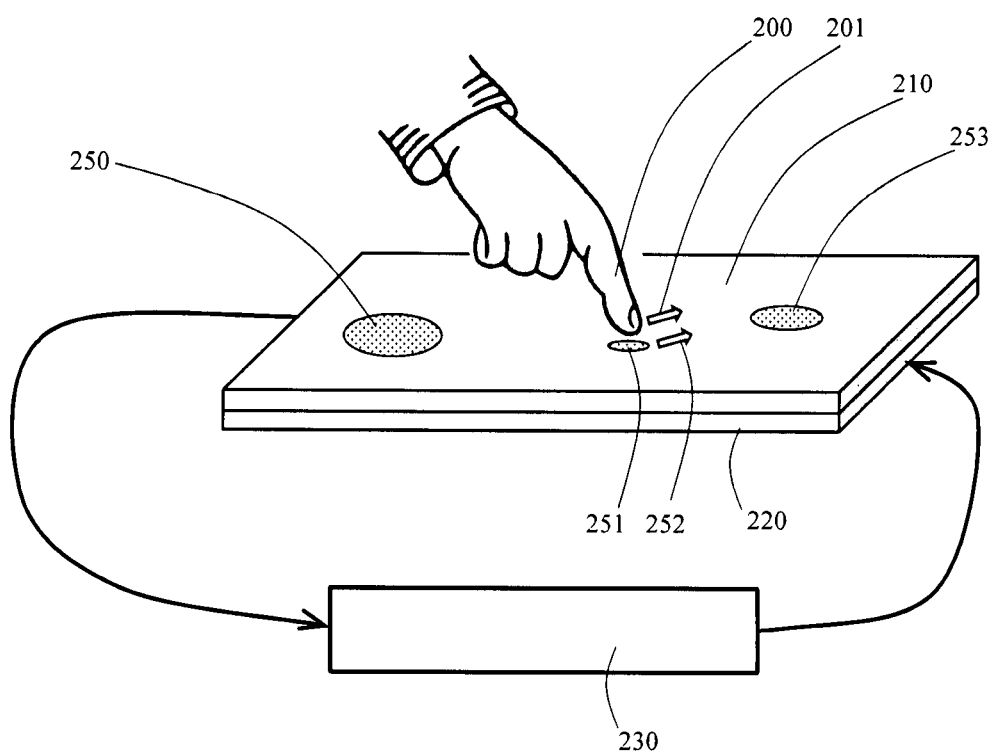
FIG. 2 is a perspective view of another embodiment of the system of the invention.

Referring now to FIG. 2, representing another embodiment of the method of this invention in device form, the position of the user's finger 200 and movement 201 is measured by the touchscreen measurement or detection system 210, feed to the system's control electronics and software unit 230, which activates the fluidic display 220. In this example, a droplet 251 can be moved in direction 252 as controlled by the electronics 230 so that it follows user's finger movement 201. As a result, a droplet of a first fluid 251 can be moved from a first storage location 250 to another location 253 perhaps in contact with another fluid for the purpose of generating a reaction.

The display of the invention may be used to create animations by moving one or more droplets in a combination of trajectories generated by the electronics and software unit 230 and trajectories calculated in reaction to the user's finger being detected on the measurement or detection system 210.

Although the system is represented here with the finger measurement device installed on top of the fluidic display, such elements may be installed at a distance of each other, so that the fluidic display may be installed on a wall while the measurement or detection system is held in hand by the user; in such case the display may have a relatively larger size than the hand-held measurement or detection system.

Figure 3:
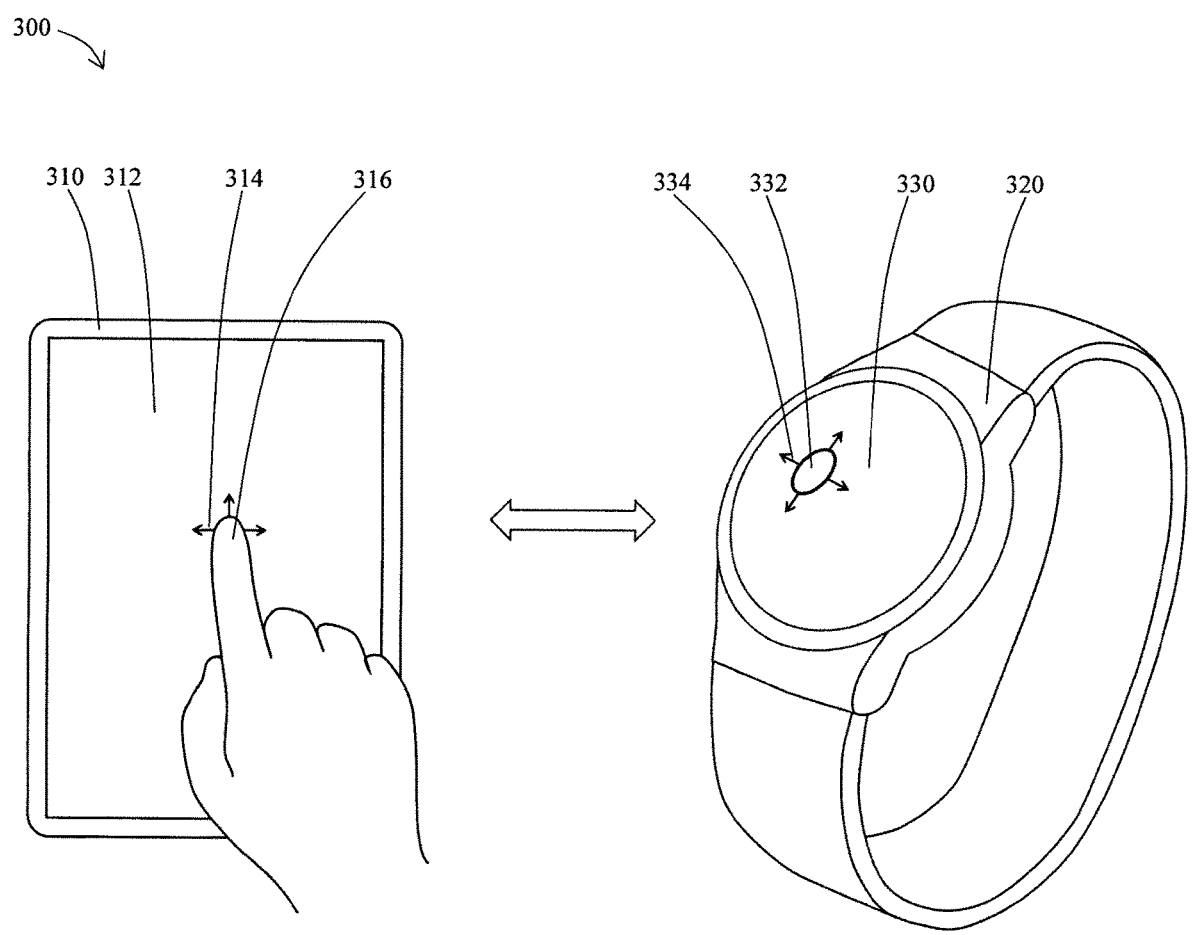
FIG. 3 is a perspective view of another embodiment of the system of the invention.

Referring now to FIG. 3, representing another embodiment of the method of this invention as a system 300 made of primarily 4 sub-systems, namely: (a) a device 310 such as for example a smartphone, a tablet or the like, equipped with a touch screen 312, (b) an application or software stored in the processor (not shown) of the device 310, (c) a wearable device 320 equipped with a fluidic display 330 and (d) control software and processor (not shown). The position and movement 314 of user's finger 316 is detected by the touchscreen 312 of the device. This information is then processed by the device's application or software and converted into movement trajectories 334 for one or more droplet(s) 332 contained in the fluidic display 330 of the wearable device 320, and then wirelessly transmitted to the wearable device 320. The software run by the processor of the wearable device 320 controls the movement commands so that movement limitations of the droplet 332 are not exceeded. Such embodiment of the method is very useful when the fluidic display is of small size and the droplet 332, although easily visible to the human eye, may be smaller than the user's finger 316, preventing the user from actually seeing the droplet he is apparently displacing at the tip of his finger. Typical applications of this method may be setting the time on a watch, bracelet, ring . . . or setting and/or displaying specific functions like chronometer, countdown, alarm functions, etc. The wearable device 320 may also be equipped with touch-sensitive sensors so that a touch of user's finger may trigger the animation or functionality described here above, or with acceleration sensors so that a given movement of the wearer of the device 320 may trigger the animation of functionality described here above.

The fluidic display may be built as a chamber containing the fluid(s), made out of glass, crystal glass, cut glass, crystal (or suitable substitute material) jewel, precious stones or half-precious stones and fixed on to a precious or non-precious metal or to a polymer or elastomer. Part of the chamber may be flexible.

The fluidic display may be built as a combination of deep and shallow channels so as to generate preferred zones for the circulation of the fluid(s) droplet(s).

Preferred zones for the circulation of droplet(s) may also be generated by a combination of coating repulsive/attractive coatings and/or surface microstructurization.

The fluidic display may be built as a combination of closed channels so as to define the circulation of the fluid(s) droplet(s). In such case the system may be used as a pump, the droplet acting as a piston.

Preferably the fluidic display shall be built as a closed unit, in such case the (thermal) expansion of the fluid(s) is managed and compensated according to the invention disclosed in the Patent applications PCT/IB2016/001448, filed on Oct. 6, 2016, PCT/IB2016/000004, filed on Jan. 7, 2016, PCT/IB2015/001611, filed on Sep. 11, 2015, PCT/IB2015/001336, filed on Aug. 6, 2015, PCT/IB2015/000446, filed on Apr. 7, 2015. PCT/IB2015/000448, filed on Apr. 7, 2015, the content of which is incorporated by reference and relied upon to define the invention claimed herein.

The movement of the droplet(s) may be generated by an electrowetting display as disclosed in patent application U.S. Ser. No. 15/877,520, filed on Jan. 23, 2018, the content of which is incorporated by reference and relied upon to define the invention claimed herein.

The system may go on standby or show a an animation on the display while the detection system is not touched by any finger, and change the animation at the touch of the user's finger, which becomes the controller.

Different sequences of touching the detection system with the finger, or with more than one finger, may trigger different actions from the electronics and software. Such a sequence may be a tapping with one or more fingers on the detection system, which may start/trigger a function or animation. In another variant, a change of orientation/acceleration of the system (which may be in form of an accessory) may start/trigger a function or animation.

The invention may be summarized by the following feature sets:

1. A method of interfacing a user with a fluidic display, the method comprising:
   measuring the user's finger position and/or movement on a surface; and
   controlling a fluidic display so as to represent the user's finger position and movement as the position and movement of one or more fluid droplet(s).
2. The method of feature set 1, wherein the controlling step further comprising:
   activating one or more control electrodes, thereby changing a layer's property such that the one or more fluid droplet(s) are attracted by said layer instead of repelled and vice versa, such activation thereby drawing the fluid droplet along a desired path.
3. A device configured to execute the method of feature set 1 or feature set 2.
4. The device of feature set 3, wherein the device is a display for demonstrating principals for educational purposes.
5. The device of feature set 3, wherein the device is decorative.
6. The device of feature set 3, wherein the device is jewelry.
7. The device of feature set 3, wherein the device is a timepiece.
8. A device comprising:
   a display configured to display one or more fluid(s);
   a measurement or detection system configured to measure or detect the position of one or more finger(s) adjacent the display; and
   an electronic und software unit;
   whereas the electronic und software unit is configured to receive from the measurement or detection system information about the current position of the one or more finger(s), and is further arranged to move the one or more fluid(s) of the display as a function of the information received from the measurement or detection system.
9. The device of feature set 8, whereas the display comprising one or more electrowetting-chamber(s) and a plurality of control electrodes, the electrowetting-chamber(s) containing the fluid(s).
10. The device of feature set 9, whereas the one or more electrowetting-chamber(s) comprise:
    a top surface and a bottom surface, the top and bottom surface being oriented substantially parallel to each other, the fluid(s) being located between the two surfaces, at least one surface being at least partially coated with a layer on its side directed towards the other surface, the layer being a layer repulsive to one of the fluids when the electrode close to that fluid is not activated, and the same layer being a layer attractive to the same fluid when the same electrode is activated.
11. The device of feature set 4, whereas the measurement or detection system is separate from the fluid display.
12. The device of any one of the feature sets 2 to 11, wherein the measuring/detecting is carried out by a sonar detector.
13. The device of the above feature set, wherein the measuring/detecting is carried out by an ultrasonic detector.
14. The device of any one of the feature sets 2 to 11, wherein the measuring/detecting is carried out by at least one capacitance detector.
15. The device of any one of the feature sets 2 to 11, wherein the measuring/detecting is carried out by triangulation.
16. The device of any one of the feature sets 2 to 11, wherein the measuring/detecting is carried out by a sonar triangulation detector.
17. The device of any one of the feature sets 2 to 11, wherein the measuring/detecting is carried out by real-time video analysis methods using inputs from at least one video camera adjacent the display, trained on the finger or fingers.

It should be appreciated that the particular implementations shown and herein described are representative of the invention and its best mode and are not intended to limit the scope of the present invention in any way.

As will be appreciated by skilled artisans, the present invention may be embodied as a system, a device, or a method.

The present invention is described herein with reference to block diagrams, devices, components, and modules, according to various aspects of the invention. It will be understood that each functional block of the blocks diagrams, and combinations of functional blocks in the block diagrams, can be implemented by computer program instructions which may be loaded onto a general purpose computer, special purpose computer, or other programmable data processing apparatus to produce a machine, such that the instructions which execute on the computer or other programmable data processing apparatus create enable the functionality specified in the block diagrams.

Accordingly, the block diagram illustrations support combinations of means for performing the specified functions, combinations of steps for performing the specified functions, and program instruction means for performing the specified functions. Each functional block of the block diagrams and flowchart illustrations, and combinations of functional blocks in the block diagrams, may be implemented by either special purpose hardware-based computer systems which perform the specified functions or steps, or suitable combinations thereof.

Moreover, the system contemplates the use, sale and/or distribution of any goods, services or information having similar functionality described herein.

The specification and figures should be considered in an illustrative manner, rather than a restrictive one and all modifications described herein are intended to be included within the scope of the invention claimed. Accordingly, the scope of the invention should be determined by the appended claims (as they currently exist or as later amended or added, and their legal equivalents) rather than by merely the examples described above. Steps recited in any method or process claims, unless otherwise expressly stated, may be executed in any order and are not limited to the specific order presented in any claim. Further, the elements and/or components recited in apparatus claims may be assembled or otherwise functionally configured in a variety of permutations to produce substantially the same result as the present invention. Consequently, the invention should not be interpreted as being limited to the specific configuration recited in the claims.

Benefits, other advantages and solutions mentioned herein are not to be construed as critical, required or essential features or components of any or all the claims.

As used herein, the terms "comprises", "comprising", or variations thereof, are intended to refer to a non-exclusive listing of elements, such that any apparatus, process, method, article, or composition of the invention that comprises a list of elements, that does not include only those elements recited, but may also include other elements such as those described in the instant specification. Unless otherwise explicitly stated, the use of the term "consisting" or "consisting of" or "consisting essentially of" is not intended to limit the scope of the invention to the enumerated elements named thereafter, unless otherwise indicated. Other combinations and/or modifications of the above-described elements, materials or structures used in the practice of the present invention may be varied or adapted by the skilled artisan to other designs without departing from the general principles of the invention.

The patents and articles mentioned above are hereby incorporated by reference herein, unless otherwise noted, to the extent that the same are not inconsistent with this disclosure.

Other characteristics and modes of execution of the invention are described in the appended claims.

Further, the invention should be considered as comprising all possible combinations of every feature described in the instant specification, appended claims, and/or drawing figures which may be considered new, inventive and industrially applicable.

Copyright may be owned by the Applicant(s) or their assignee and, with respect to express Licensees to third parties of the rights defined in one or more claims herein, no implied license is granted herein to use the invention as defined in the remaining claims. Further, vis-à-vis the public or third parties, no express or implied license is granted to prepare derivative works based on this patent specification, inclusive of the appendix hereto and any computer program comprised therein.

Additional features and functionality of the invention are described in the claims appended hereto and/or in the abstract. Such claims and/or abstract are hereby incorporated in their entirety by reference thereto in this specification and should be considered as part of the application as filed.

Multiple variations and modifications are possible in the embodiments of the invention described here. Although certain illustrative embodiments of the invention have been shown and described here, a wide range of changes, modifications, and substitutions is contemplated in the foregoing disclosure. While the above description contains many specific details, these should not be construed as limitations on the scope of the invention, but rather exemplify one or another preferred embodiment thereof. In some instances, some features of the present invention may be employed without a corresponding use of the other features. Accordingly, it is appropriate that the foregoing description be construed broadly and understood as being illustrative only, the spirit and scope of the invention being limited only by the claims which ultimately issue in this application.

What is claimed is:

1. A method of interfacing a user with a fluidic display, the method comprising the steps of:

(a) measuring the user's finger position and/or movement on a finger-contact-surface; and
    (b) controlling movement of at least one liquid moving in the fluidic display so as to represent the user's finger position and movement, movement of the liquid being in a direction parallel or at least substantially parallel to a surface of said fluidic display, so that it follows the user's finger movement, wherein the liquid located within the electrical field generated by a first electrode and a control electrode and partially within the electrical field generated by the first, common electrode and at least one second control electrode so that the electric activation of the second control electrode generates a movement of the liquid in the direction of the second control electrode.

2. The method of claim 1, wherein the controlling step further comprising:

activating one or more control electrodes, thereby changing a layer's property such that the one or more liquid fluid droplet(s) are attracted by said layer instead of repelled and vice versa, such activation thereby drawing the liquid fluid droplet along a desired path.

3. A device configured to execute the method of claim 1.

4. The device of claim 3, wherein the device is a display for demonstrating principals for educational purposes.

5. The device of claim 3, wherein the device is decorative.

6. The device of claim 3, wherein the device is jewelry.

7. The device of claim 3, wherein the device is a timepiece.

8. A device comprising:

a display configured to display one or more liquid(s);
    a measurement or detection system configured to measure or detect the position of one or more finger(s) adjacent a finger-contact-surface; and
    an electronic und software unit; whereas the electronic und software unit is configured to receive from the measurement or detection system information about the current position of the one or more finger(s), and is further arranged to move the one or more liquid(s) of the display as a function of the information received from the measurement or detection system in a direction parallel or at least substantially parallel to a surface of said fluidic display, so that it follows the user's finger movement.

9. The device of claim 8, whereas the display comprises one or more electrowetting-chamber(s) and a plurality of control electrodes, the electrowetting-chamber(s) containing the liquid(s).

10. The device of claim 9, whereas the one or more electrowetting-chamber(s) comprise: a top surface and a bottom surface, the top and bottom surface being oriented substantially parallel to each other, the liquid(s) being located between the top and bottom surfaces, a first of the top and bottom surfaces being at least partially coated with a layer on its side directed towards the second of the top and bottom surfaces, the layer being a layer repulsive to one of the liquid when the electrode close to that liquid is not activated, and the same layer being a layer attractive to the same liquid when the same electrode is activated.

11. The device of claim 8, whereas the measurement or detection system is separate from the fluid display.

12. The device of claim 8, wherein the measuring/detecting is carried out by a sonar detector.

13. The device of claim 8, wherein the measuring/detecting is carried out by an ultrasonic detector.

14. The device of claim 8, wherein the measuring/detecting is carried out by at least one capacitance detector.

15. The device of claim 8, wherein the measuring/detecting is carried out by triangulation.

16. The device of claim 8, wherein the measuring/detecting is carried out by a sonar triangulation detector.

17. The device of claim 8, wherein the measuring/detecting is carried out by realtime video analysis methods using inputs from at least one video camera adjacent the display, trained on the finger or fingers.

\* \* \* \* \*